United States Patent [19]
Kunze et al.

[11] Patent Number: 5,742,447
[45] Date of Patent: Apr. 21, 1998

[54] AUTO-REVERSE TAPE DECK COMPRISING A SWITCHING DEVICE

[75] Inventors: Norbert Kunze, Diez; Stefan Koch, Bad Endbach, both of Germany

[73] Assignee: U.S. Philips Corporation, New York, N.Y.

[21] Appl. No.: 788,720

[22] Filed: Jan. 23, 1997

[30] Foreign Application Priority Data

Jan. 26, 1996 [DE] Germany ............. 196 02 741.1

[51] Int. Cl.⁶ .................................... G11B 15/44
[52] U.S. Cl. ......................................... 360/96.2
[58] Field of Search ........................ 360/96.1, 96.2, 360/96.5, 96.6, 96.3

[56] References Cited

U.S. PATENT DOCUMENTS

| | | | |
|---|---|---|---|
| 4,564,873 | 1/1986 | Hashimoto et al. | 360/90 |
| 5,062,014 | 10/1991 | Yoshimura | 360/96.2 |
| 5,144,507 | 9/1992 | Kurita | 360/96.2 |
| 5,581,431 | 12/1996 | D'Alayer de Costemore D'Arc | 360/96.2 X |

FOREIGN PATENT DOCUMENTS

0290079A2  11/1988  European Pat. Off. .

*Primary Examiner*—John H. Wolff
*Attorney, Agent, or Firm*—Michael E. Belk

[57] ABSTRACT

The invention relates to a switching device in an auto-reverse deck for a magnetic-tape-cassette apparatus, comprising a drive mechanism which is pivotable in a pivoting range between a first and a second reel-disc wheel (51, 52), by means of which drive mechanism the first reel-disc wheel (51) is drivable in a first operating position of the switching device for a first tape-transport direction and the second reel-disc wheel (52) is drivable in a second operating position of the switching device for a second tape-transport direction, the drive mechanism acting upon a movably supported actuating lever (5) during the pivotal movement between the two operating positions and a pivotal lever (44) being provided which carries a pivotal wheel (50), and the pivotal lever (44) being coupled to an intermediate wheel (41), particularly by means of a friction coupling (45), which intermediate wheel meshes with the pivotal wheel (50). In order to enable switching over with a high power in a larger angular range, the actuating lever (5) has teeth (11) which are engageable with the pivotal wheel (50) mounted on the pivotal lever (44) of the pivotable drive mechanism, a pivotably supported armature lever (15) has been provided whose pivotal movement is controlled by the movement of the actuating lever (5), the pivoting pivotal lever (44) engages against a stop edge (17, 18) of the armature lever (15) in the central part of the pivoting range, so that subsequently, owing to the engagement of the pivotal lever (44) against the stop edge (17, 18) of the armature lever (15), meshing forces are transmitted to the teeth (11) of the actuating lever (5) by means of the intermediate wheel (41) and the pivotal wheel (50), as a result of which said actuating lever is pivoted.

7 Claims, 5 Drawing Sheets

AUTO-REVERSE TAPE DECK COMPRISING A SWITCHING DEVICE

BACKGROUND OF THE INVENTION

Field of the Invention

The invention is related to the field of tape recorders and tape players.

The invention relates to a switching device in an auto-reverse deck for a magnetic-tape-cassette apparatus, including a drive mechanism which is pivotable in a pivoting range between a first and a second reel-disc wheel, by means of which drive mechanism the first reel-disc wheel is drivable in a first operating position of the switching device for a first tape-transport direction and the second reel-disc wheel is drivable in a second operating position of the switching device for a second tape-transport direction. The drive mechanism acts upon a movably supported actuating lever during the pivotal movement between the two operating positions. A pivotal lever carries a pivotal wheel, and is coupled to an intermediate wheel, by a friction coupling. The intermediate wheel meshes with the pivotal wheel.

Such a device is known from the Philips SCA cassette deck and from EP 290079. In this known device a pivotal lever, which is pivotable about the spindle of an intermediate wheel, carries a pivotal wheel which during the pivotal movement meshes with teeth which are fixedly connected to the deck plate of the deck and, while the pivotal wheel is in mesh with the teeth connected to the deck plate, can perform switching operations requiring high power in the tape deck. For this purpose the pivotal lever is coupled to an actuating lever, which acts upon an actuating slide, which effects the pressure-roller change-over for the two playback devices. The pivoting range of the pivotal lever has been designed in such a manner that in the play mode the teeth of the pivotal wheel are engageable with the reel-disc wheels, which drive the reels in the cassette and which are not engageable in a stand-by mode (Stand-By). In the stand-by mode, however, the pivotal wheel should not be in mesh with the teeth on the deck plate, because this would give rise to undesirable switching operation, which would impair the correct operation of the tape deck. The above citation is hereby incorporated in whole by reference.

SUMMARY OF THE INVENTION

In the invention, the inventor's recognized that the pivoting range of the pivotal lever, in which range the pivotal wheel should neither be in mesh with the teeth on the deck plate nor with the reel-disc wheels, is susceptible to tolerances and limits the range in which switching with a high power is possible.

It is an object of the invention to provide a device which enables the pivotal lever to be changed over in a large angular range with high power without the risk of the pivotal wheel of the pivotal lever causing undesirable switching operations in the stand-by mode.

According to the invention this object is achieved in that the actuating lever has teeth which are engageable with the pivotal wheel mounted on the pivotal lever of the pivotable drive mechanism, a pivotably supported armature lever has been provided whose pivotal movement is controlled by the movement of the actuating lever, the pivoting pivotal lever engages against a stop edge of the armature lever in the central part of the pivoting range, so that subsequently, owing to the engagement of the pivotal lever against the stop edge of the armature lever, meshing forces are transmitted to the teeth of the actuating lever by means of the intermediate wheel and the pivotal wheel, as a result of which said actuating lever is pivoted.

If the teeth of the actuating lever are disposed within the pivoting range of the pivotal lever, the pivotal lever is pivoted, for example, by means of the frictional force transmitted by the friction coupling in an initial and a final part of the pivoting range. In the central part of the pivoting range the pivoting pivotal lever acts upon a stop edge of the armature lever. In this central part of the pivoting range the teeth of the actuating lever are in mesh with the teeth of the pivotal wheel. Subsequently, the pivotal lever can abut against the stop edge of the armature lever and meshing forces can be transmitted to the teeth of the actuating lever by means of the intermediate wheel and the pivotal wheel. These forces transmitted to the actuating lever by means of the meshing forces are distinctly larger than the frictional forces which can be transmitted by means of the friction coupling. Thus, it is possible to activate also apparatus functions requiring a high power by means of the actuating lever in the central part of the pivoting range. Since the actuating lever and, as a consequence, the teeth of the actuating lever are pivoted in a direction opposite to the pivoting direction of the pivotal wheel, the distance between the actuating lever teeth and the reel-disc wheels in the stand-by mode is increased.

An advantageous embodiment of the invention is characterized in that the actuating lever is supported on a carrier element which is mounted on the deck plate and on which a magnetic head can be mounted, and the actuating lever is movable out of the pivoting range of the pivotal lever by movement of the carrier element.

Since the teeth provided on the actuating lever in order to increase the available switching torque, which teeth mesh with the teeth of the pivotal wheel supported on the pivotal lever, are moved out of the pivoting range of the pivotal lever in the stand-by mode, the pivoting range of the pivotal lever in which the pivotal wheel should neither be in mesh with the teeth on the deck plate nor with the reel-disc wheels, is no longer limited anyway by the teeth of the actuating lever, as a result of which the tape deck becomes less susceptible to tolerances.

In a preferred embodiment of the invention the actuating-lever teeth have been provided on an end face of the actuating lever and the direction of movement of the pivotal lever and the direction of movement of the actuating lever are oriented substantially parallel to one another in the central part of the pivoting range.

In a further advantageous embodiment of the invention the armature lever is pivotably supported on a deck plate.

The pivotal movement of the armature lever is preferably controlled by means of the movement of the actuating lever in that the armature lever comprises a guide element which engages in a guide opening in the actuating lever or the actuating lever has a guide element which engages in a guide opening in the armature lever. Such a construction can be realized in a simple, cheap and reliable manner.

In another advantageous embodiment of the invention the guide opening in the actuating lever is a slot having two parts of different width, the width of the slot in a narrow first part corresponding substantially to the width of the guide element and the width of the slot in a broad second part being larger than the width of the guide element.

The provision of a slot enables the actuating lever to be shifted relative to the armature lever. When the guide element is disposed in the narrow part of the slot, a pivotal movement of the is converted into a pivotal movement of the armature lever. When the guide element is disposed in the broad part of the slot, the actuating lever can pivot within this broad part without acting upon the armature lever.

A further advantageous embodiment of the invention is characterized in that the actuating lever actuates a switching mechanism by means of which a first pressure roller for a first tape-transport direction can be applied to a first capstan and a second pressure roller for a second tape-transport direction can be applied to a second capstan.

Preferably, a switching device in accordance with the invention is used in a tape deck or in a magnetic-tape-cassette apparatus comprising a tape deck.

Those skilled in the art will understand the invention and additional objects and advantages of the invention by studying the description of preferred embodiments below with reference to the following drawings which illustrate the features of the appended claims.

BRIEF DESCRIPTION OF THE DRAWINGS

An embodiment of the invention will now be described in more detail reference to FIGS. 1 to 5 of the drawings. In the drawings.

DETAILED DESCRIPTION OF PREFERRED EMBODIMENTS OF THE INVENTION

Figure 1:
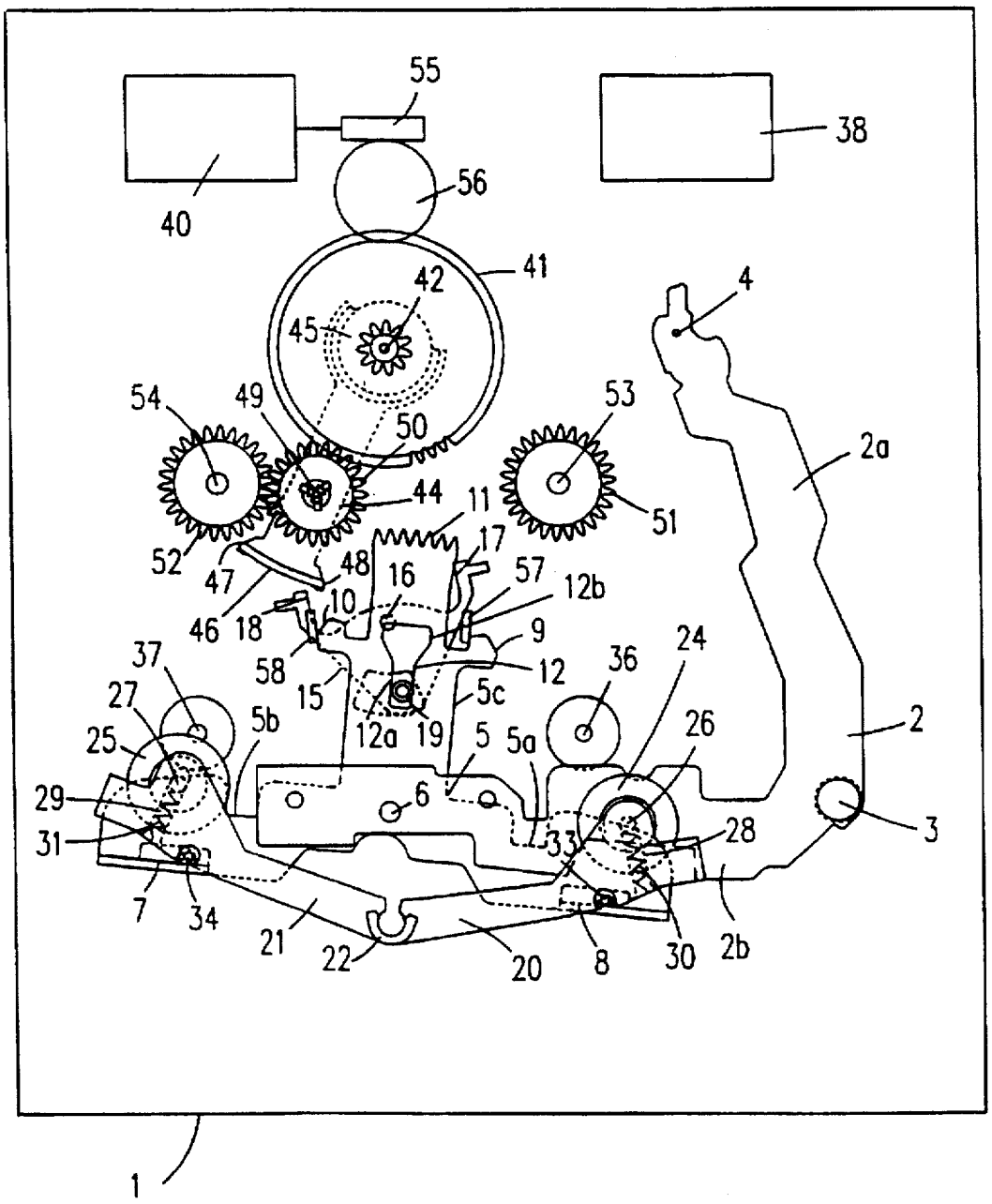
FIG. 1 is a plan view of parts of an auto-reverse deck of a magnetic-tape-cassette apparatus comprising a switching device for pressure rollers which are supported on pressure roller levers and which are engageable with capstans, and comprising a drive mechanism which is pivotable between two reel-disc wheels in a first tape transport direction (Play REV)
Figure 2:
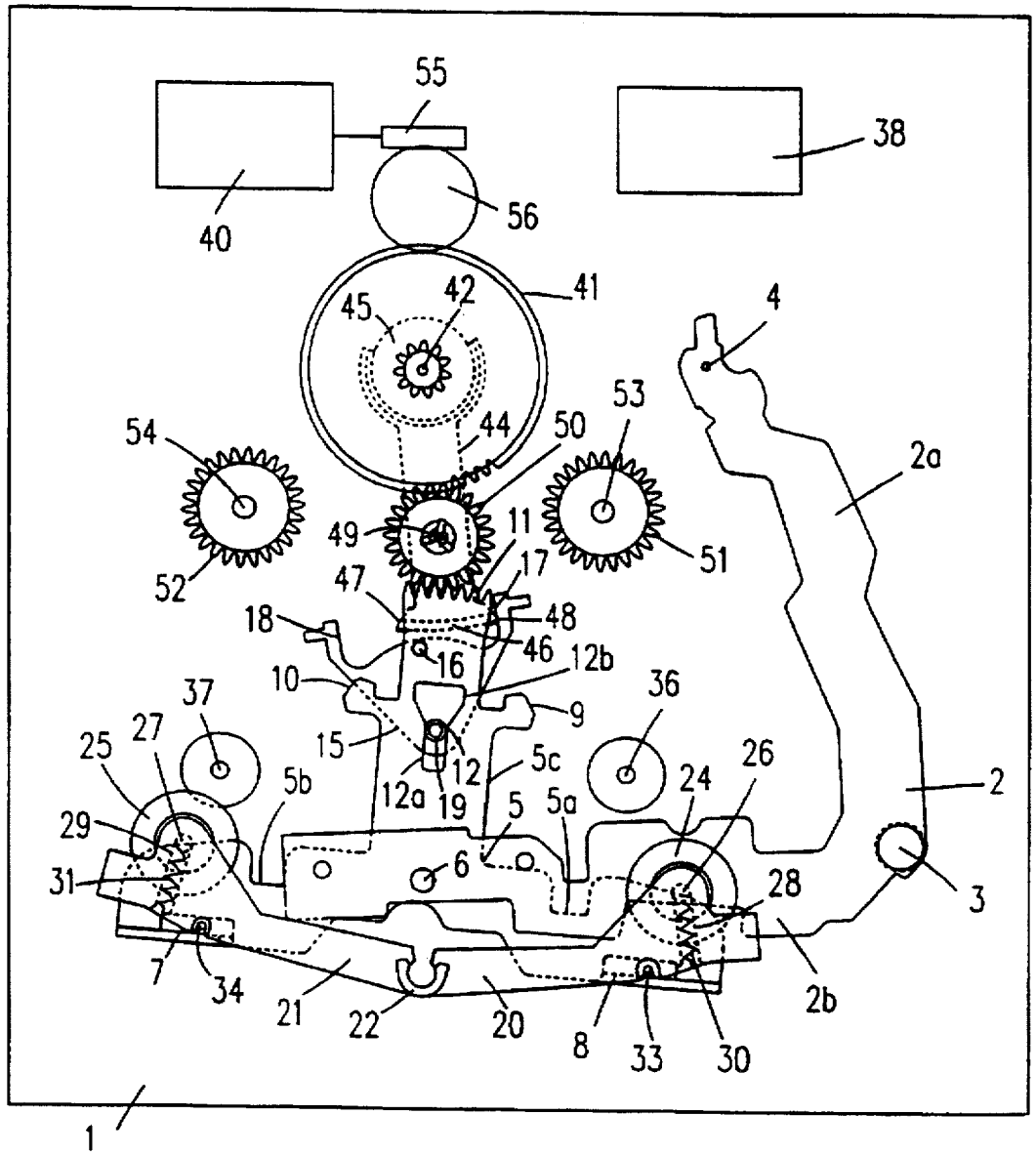
FIG. 2 is a plan view of parts of the auto-reverse deck, the deck being in a first intermediate position during the change-over from the first tape transport direction (Play REV) to a second tape transport direction (Play NOR), in which position the pivotal movement of a pivotal lever is braked by an armature lever.

FIGS. 1, 2, 3, 4 and 5 diagrammatically show parts of an auto-reverse deck in plan views in different modes of operation. FIG. 1 shows the operating position for a first tape transport direction (Play REV). The tape deck in accordance with the invention shown in FIG. 1 comprises a chassis formed by a deck plate 1, on which a carrier element 2 is mounted so as to be pivotable about a pivot 3. The carrier element 2 has a limb 2a and a limb 2b. The limb 2a of the carrier element 2 carries a guide pin 4. This guide pin 4 engages a cam profile, not shown, of a cam disc, not shown. This cam disc, not shown, exerts the forces required for pivoting the carrier element 2 about the pivot 3 on the guide pin 4. A magnetic-head tape-guide unit, not shown, is supported on the carrier element 2. The magnetic-head tape-guide unit, not shown, can be moved towards a magnetic tape, not shown, in a magnetic-tape cassette by turning the carrier element 2 about the pivot 3. An actuating lever 5 is supported on the carrier element 2 so as to be pivotable about a pivot 6. The actuating lever 5 is T-shaped and has two transverse limbs 5a and 5b as well as a central limb 5c. The transverse limbs 5a and 5b of the actuating lever 5 each have a slot 7 and 8, respectively. On one side the central limb 5c of the actuating lever 5 has a projection 9 and on the opposite side it has a projection 10. The end face of the central limb 5c is formed with actuating-lever teeth 11. The central limb 5c of the actuating lever 5 has a guide opening in the form of an actuating-lever slot 12, which is a longitudinal slot and has a narrow part 12a and a broad part 12b.

An armature lever 15 is mounted on the deck plate 1 so as to be pivotable about a pivot 16. The armature lever 15 has stop edges formed by two projections 17 and 18 and a guide element formed by an armature-lever pin 19, which engages the actuating-lever slot 12 in the actuating lever 5.

A first pressure-roller lever 20 and a second pressure-roller lever 21 are mounted on the deck plate 1 so as to be pivotable about a common pivot 22. As an alternative, the pressure-roller levers 20 and 21 can be mounted on spaced-apart pivots (not shown). The free end of the first pressure-roller lever 20 carries a first pressure roller 24 and the free end of the second pressure-roller lever 21 carries a second pressure roller 25. The first pressure roller 24 has a first central pin 26 and the second pressure roller 25 has a second central pin 27. The first central pin 26 is movable in a slot 28 in the first pressure-roller lever 20 and is restrained relative to the first pressure-roller lever 20 by means of a spring 30, which is shown diagrammatically. The second central pin 27 is movable in a slot 29 in the second pressure-roller lever 21 and is restrained relative to the first pressure-roller lever 21 by means of a spring 31. The first pressure-roller lever 20 has a projection 33, which engages in the slot 8 of the actuating lever 5. The second pressure-roller lever 21 has a projection 34, which engages in the slot 7 of the actuating lever 5.

The deck plate 1 carries two capstans 36 and 37 coupled to flywheels, not shown. A reversible capstan motor 38 serves to drive the capstans 36 and 37. The capstan motor 38 drives the capstans 36 and 37 by means of a belt, not shown, which is wrapped around the flywheels, not shown, in a manner which is not shown.

In addition to the capstan motor 38 there is provided a reversible servo motor 40, which can drive an intermediate wheel 41 in two directions about a shaft 42 mounted on the deck plate 1 by means of a worm shaft 55 and a reduction gear wheel 56. In addition to the intermediate wheel 41, a pivotal lever 44 is mounted for rotation about the shaft 42. The intermediate wheel 4I and the pivotal lever 44 are coupled to one another via a friction coupling 45. The pivotal lever 44 has an end face 46 with two lateral edges 47 and 48. Moreover, the pivotal lever 44 carries a pivotal-lever pin 49 about which a pivotal wheel 50 is rotatable. The pivotal wheel 50 can selectively be brought in mesh with a first reel-disc wheel 51 and a second reel-disc wheel 52 by a pivotal movement of the pivotal lever 44. The first reel-disc wheel 51 is rotatable about a shaft 53 and the second reel-disc wheel 52 is rotatable about a shaft 54 mounted on the deck plate 1. The reel-disc wheels 51 and 52 are engageable in openings, not shown, in a magnetic-tape cassette, not shown. The deck plate 1 carries two chassis stops 57 and 58 against which the projections 9 and 10 of the actuating lever 5 can be urged.

In the mode of operation (Play REV) illustrated in FIG. 1 the servo motor 40 drives the second reel-disc wheel 52 by means of the worm shaft 55, the reduction gear wheel 56, the intermediate wheel 41 and the pivotal wheel 50. At the same time the capstan motor 38 drives flywheels, not shown, of the capstans 36 and 37 via belts, not shown. As a result of this, the magnetic tape is moved in the first tape transport direction (Play REV) by the capstan 37 and the second pressure roller 25, which is pressed against the capstan 37. When the second pressure roller 25 is applied to the capstan 37 the second central pin 27 is moved in the slot 29 in the second pressure-roller lever 21 and the spring 31 is tensioned relative to the second pressure-roller lever 21. As a result, the second pressure roller 25, while applied to the capstan 37, exerts a force on the actuating lever 5 by means of the spring 31, the second pressure-roller lever 21, and the projection 34 of the pressure-roller lever 21, the actuating lever in its turn exerting a force on the carrier element 2. The first pressure roller 24 and the pressure-roller lever 20 do not exert any force on the actuating lever 5 and, consequently, do not exert any force on the carrier element 2 in the Play REV mode.

Hereinafter, the change-over from the first tape-transport direction (Play REV) to the opposite tape-transport direction (PLAY NOR) will be described in more detail. Starting from the first tape-transport direction (Play REV) represented in FIG. 1, the carrier element is rotated counter-clockwise by the cooperation of the cam disc, not shown, with the guide pin 4 of the carrier element 2, said element being rotated until the projections 9 and 10 of the actuating lever 5 no longer act upon the chassis stops 57 and 58, as a result of which the position of the actuating lever 5 is no longer dictated by the chassis stops 57 and 58. The further switching process is now started by the servo motor 40. The servo motor 40 now reverses, i.e. its direction of rotation is changed, and drives the intermediate wheel 41 via the worm shaft 55 and the reduction gear wheel 56 in such a manner that this intermediate wheel is rotated counter-clockwise. The intermediate wheel 41, which rotates counterclockwise, exerts a counter-clockwise force on the pivotal lever 44 by means of the friction coupling 45, thereby causing the pivotal lever 44 to be moved in a counter-clockwise direction towards the teeth 11 of the actuating lever 5. As the pivotal lever 44 is pivoted further the teeth of the pivotal wheel 50 mesh with the teeth 11 of the actuating lever 5. Subsequently, owing to the friction torque exerted by the friction coupling 45, the pivotal lever 44 is moved further counter-clockwise until its lateral edge 48 abuts against the projection 17 of the armature lever 15. This is the position shown in FIG. 2.

Figure 3:
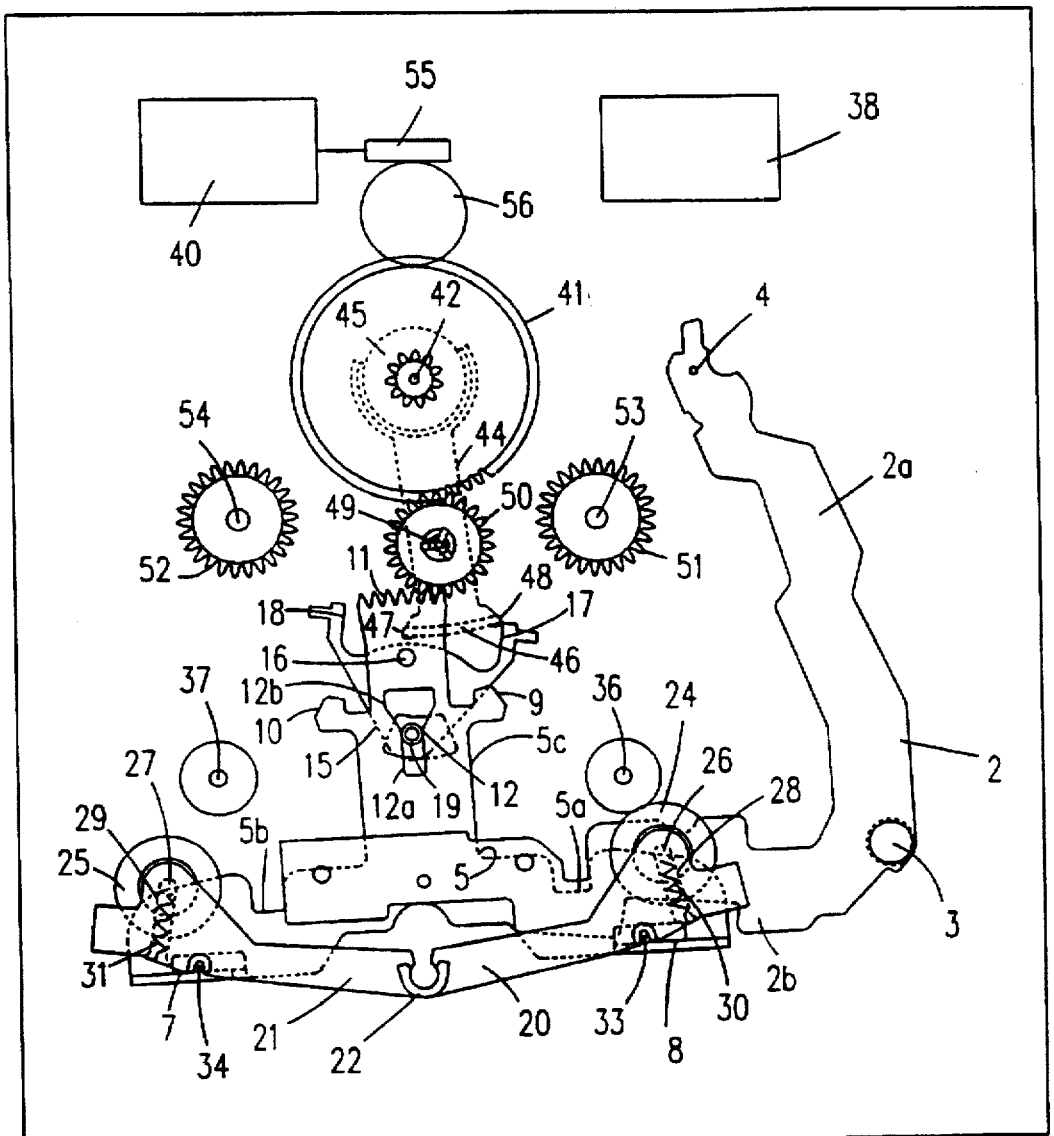
FIG. 3 is a plan view of parts of the auto-reverse deck, the deck being in a second intermediate position during the change-over between the first tape transport direction (PLay REV) and the second tape transport direction (Play NOR), in which position the armature lever just releases the pivotal lever.

As a result of the abutment of the lateral edge 48 against the projection 17 of the armature lever 15 the free pivotal movement of the pivotal lever 44, caused by the friction torque exerted on the pivotal lever 44 by means of the intermediate wheel 41 and the friction coupling 45, stops. Since the pivotal lever 44 can subsequently abut against the armature lever 15 in a central part of the pivoting range, the rotatory forces of the intermediate wheel 41 can be transmitted directly, through the meshing forces, from the teeth of the intermediate wheel 41 to the teeth of the pivotal wheel 50 and from the teeth of the pivotal wheel 50 to the actuating-lever teeth 11 of the actuating lever 5. The actuating lever 5 is thus pivoted counter-clockwise by means of the meshing forces, which are distinctly larger than the forces which can be transmitted by means of the friction coupling. The pivoting actuating lever 5 acts upon the armature-lever pin 19 via its actuating-lever slot 12, as a result of which the armature lever 15 is rotated clockwise about its pivot 16. Owing to the meshing forces between the pivotal wheel 50 and the teeth 11 of the actuating lever 5 the pivotal lever 44 follows the projection 17 of the armature lever 15 with its lateral edge 48 until the projection 17 of the armature lever 15 releases the lateral edge 48 of the pivotal lever 44. This position of the actuating lever 5, the armature lever 15 and the pivotal lever 44 is shown in FIG. 3.

Figure 4:
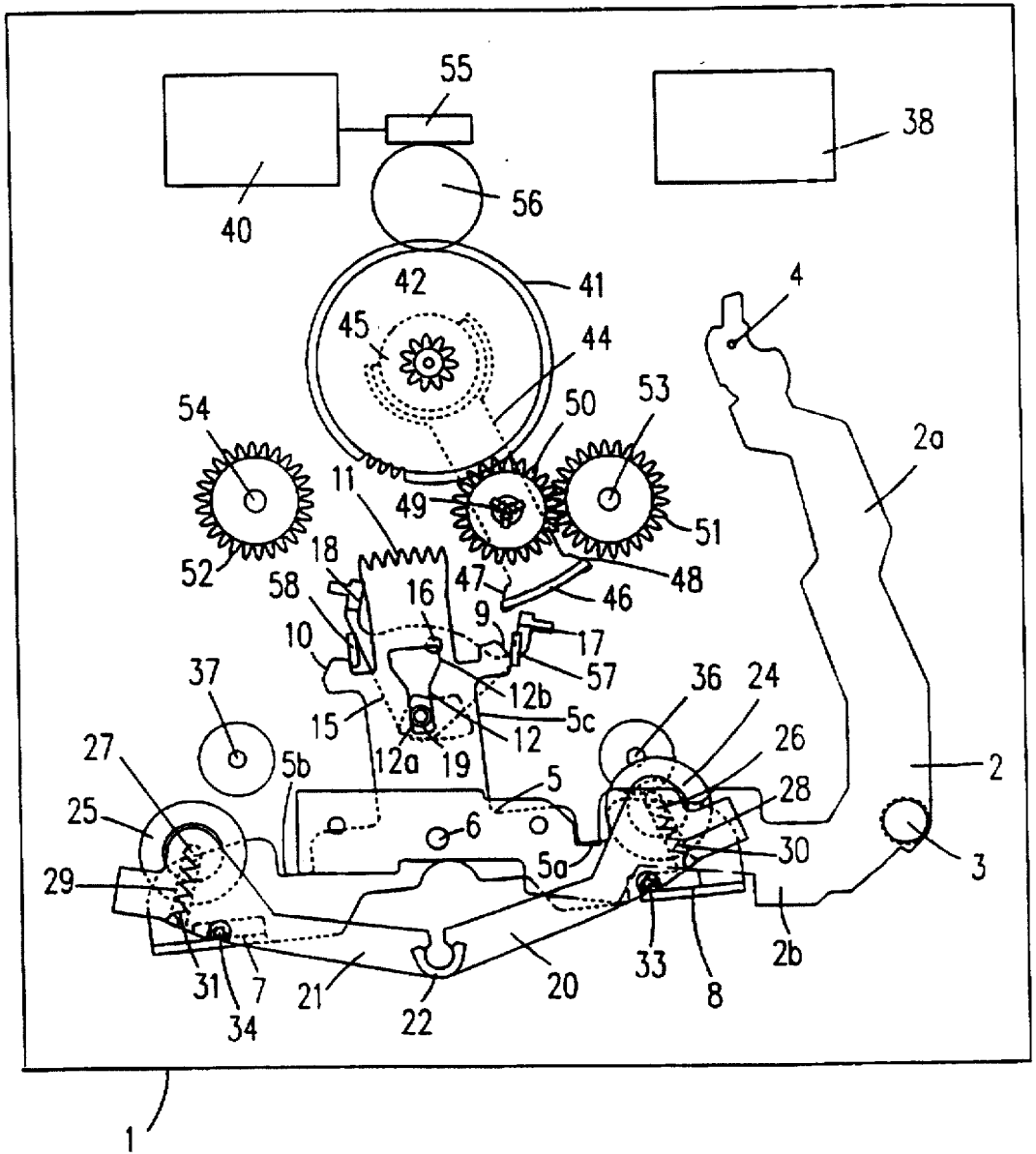
FIG. 4 is a plan view of parts of the auto-reverse deck in the second tape transport direction (Play NOR)

As soon as the projection 17 of the armature lever 15 releases the lateral edge 48 of the pivotal lever 44, the pivotal lever 44 can no longer abut against the armature lever 15 and, consequently, the rotatory force of the intermediate wheel 41 can no longer be transmitted to the teeth 11 of the actuating lever 5 through the meshing forces. In a subsequent final part of the pivoting range the pivotal lever 44 is therefore only pivoted by means of the friction torque applied by the friction coupling 45. As the pivotal lever 44 is pivoted further the teeth of the pivotal wheel 50 become disengaged from the actuating-lever teeth 11 of the actuating lever 5 and, as a result of the friction torque applied by the friction coupling 45, the pivotal lever 44 with the pivotal wheel 50 is pivoted counter-clockwise to mesh with the teeth of the reel-disc wheel 51. The meshing forces between the reel-disc wheel 51, the pivotal wheel 50 and the intermediate wheel 41 are self-engaging (as shown in FIG. 4).

Subsequently, the carrier element 2 is pivoted clockwise in that the cam profile, not shown, of the cam disc, not shown, acts upon the guide pin 4 mounted on the end of the limb 2a. When the carrier element 2 is pivoted the actuating lever 5, which is mounted on the carrier element 2 so as to be pivotable about the pivot 6, is moved towards the reel-disc wheels 53 and 54. The right-had projection 9 of the actuating lever 5 then engages against the lea-hand side of the chassis stop 57 and slides along this stop. When the carrier element 2 has been pivoted into the play position for the second tape-transport direction (Play NOR), the actuating lever 5 also assumes the operating position for Play NOR, which position is determined by the position of the carrier element 2 and by the chassis stops 57 and 58. During the movement of the actuating lever 5 from the Play REV position to the Play NOR position the pressure-roller levers 20 and 21 are at the same time moved from the operating position for the first tape-transport direction (Play REV) to the operating position for the second tape-transport direction (Play NOR) by means of the projections 33 and 34 of the pressure-roller levers 20 and 21, which are guided in the slots 7 and 8 of the actuating lever 5. As a result of this, the right-hand pressure roller 24 is applied to the right-hand capstan 36 and the magnetic tape is moved in the NOR direction. When the first pressure roller 24 is applied to the capstan 36 the first central pin 26 is moved in the slot 28 of the first pressure-roller lever 20 and the spring 30 is tensioned relative to the first pressure-roller lever 20. As a result, the first pressure roller 24, which engages with the capstan 36, exerts a force on the actuating lever 5 by means of the spring 30, the first pressure-roller lever 20 and the projection 33 of the pressure-roller lever 20, the actuating lever 5 in its turn exerting a force on the carrier element 2. In the Play NOR mode the second pressure roller 25 and the second pressure-roller lever 21 do not exert any force on the actuating lever 5 and, consequently, neither on the carrier element 2. Thus, only the first pressure roller 24, which should be applied to the capstan 36 for the transport of the magnetic tape in the Play NOR mode, exerts a force on the actuating lever 5 and the carrier element 2 while being pressed against this capstan 36. Conversely, the second pressure roller 25, which actually has no function in the Play NOR mode, "freewheels" and does not exert any force on the actuating lever 5 and the carrier element 2.

Figure 5:
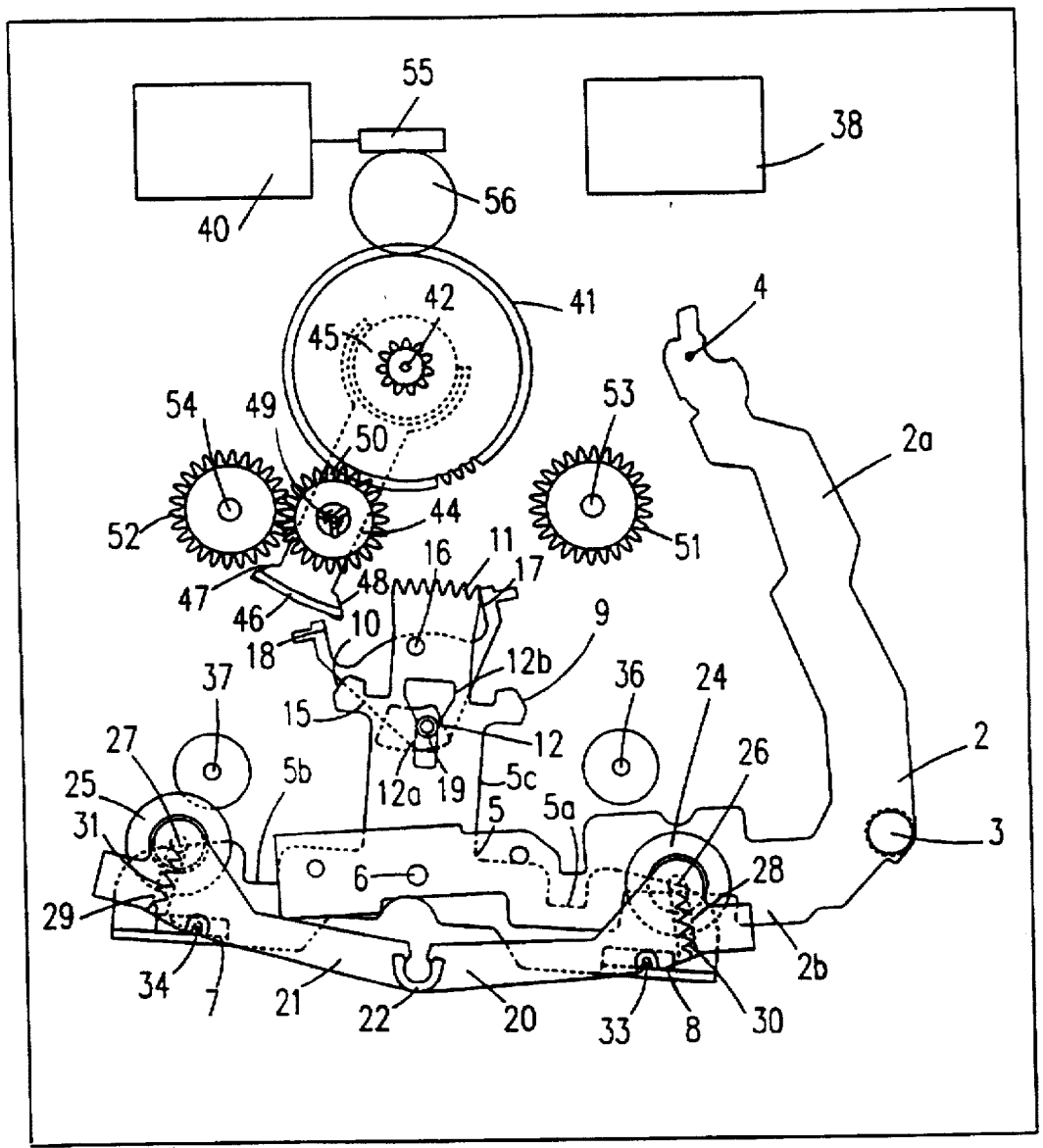
FIG. 5 is a plan view of parts of the auto-reverse deck in a first fast-winding position (Fast REV).

FIG. 5 is a plan view of parts of the auto-reverse deck in a first fast-winding position (Fast Reverse). In comparison with the position shown in FIG. 1 the carrier element 2 has been pivoted counter-clockwise about the pivot 3. During its pivotal movement the pivoting carrier element 2 drives the actuating lever 5, which is mounted on the carrier element 2 so as to be pivotable about the pivot 6. By means of its slots 7 and 8 the actuating lever 5 cooperates with the projections 33 and 34 of the pressure-roller levers 20 and 21. As a result of this, the pressure roller 25 is lifted off the capstan 37 and the magnetic tape, not shown, can be moved past the capstans 36 and 37 by means of the reel-disc wheels 53 and 54, without the pressure rollers 24 and 25 being in contact with the magnetic tape, not shown.

The carrier element 2 can be pivoted counter-clockwise beyond the position shown in FIG. 5 into a stand-by position (Stand-By), in which there is no transport of the magnetic tape. In this stand-by position the actuating lever 5 has been moved out of the pivoting range of the pivotal lever 44. In the stand-by mode the pivotal wheel 50 is not in mesh with any of the reel-disc wheels 53 and 54. Since the actuating lever 5 with its actuating-lever teeth 11 has been moved completely out of the pivoting range of the pivotal lever 44 there is no risk of the pivotal wheel 50 meshing with the actuating-lever teeth 11 of the actuating lever 5 and thereby causing undesirable switching operations in the stand-by mode.

The invention has been disclosed with reference to specific preferred embodiments, to enable those skilled in the art to make and use the invention, and to describe the best mode contemplated for carrying out the invention. Those skilled in the art may modify or add to those embodiments or provide other embodiments without departing from the spirit of the invention. Thus, the scope of the invention is only limited by the following claims.

We claim:

1. A switching device in an auto-reverse deck for a magnetic-tape-cassette apparatus, comprising a drive mechanism which is pivotable in a pivoting range between a first and a second reel-disc wheel, by means of which drive mechanism the first reel-disc wheel is drivable in a first operating position of the switching device for a first tape-transport direction and the second reel-disc wheel is drivable in a second operating position of the switching device for a second tape-transport direction, the drive mechanism acting upon a movably supported actuating lever during the pivotal movement between the two operating positions and a pivotal lever being provided which carries a pivotal wheel, and the pivotal lever being coupled to an intermediate wheel particularly by means of a friction coupling, which intermediate wheel meshes with the pivotal wheel, in which:

the actuating lever has teeth which are engageable with the pivotal wheel mounted on the pivotal lever of the pivotable drive mechanism, a pivotably supported armature lever has been provided whose pivotal movement is controlled by the movement of the actuating lever, the pivoting pivotal lever engages against a stop edge, of the armature lever in the central part of the pivoting range, so that subsequently, owing to the engagement of the pivotal lever against the stop edge of the armature lever, meshing forces are transmitted to the teeth of the actuating lever by means of the intermediate wheel and the pivotal wheel, as a result of which said actuating lever is pivoted.

2. A switching device as claimed in claim 1, characterized in that the actuating lever is supported on a carrier element which is mounted on a deck plate and on which a magnetic head can be mounted, and the actuating lever is movable out of the pivoting range of the pivotal lever by movement of the carrier element.

3. A switching device as claimed in claim 1, characterized in that the actuating-lever teeth have been provided on an end face of the actuating lever and the direction of movement of the pivotal lever and the direction of movement of the actuating lever are oriented substantiality parallel to one another in the central part of the pivoting range.

4. A switching device as claimed in claim 1, characterized in that the armature lever is pivotably supported on a deck plate.

5. A switching device as claimed in claim 1, characterized in that the armature lever comprises a guide element which engages in a guide opening in the actuating level or the actuating level has a guide element which engages in a guide opening in the armature lever.

6. A switching device as claimed in claim 5, characterized in that the guide opening in the actuating lever having two parts of different width, the width of the slot in a narrow first part corresponding substantially to the width of the guide element and the width of the slot in a broad second part being larger than the width of the guide element.

7. A switching device as claimed in claim 1, characterized in that the actuating lever actuates a switching mechanism by means of which a first pressure roller for a first tape-transport direction can be applied to a first capstan and a second pressure roller for a second tape-transport direction can be applied to a second capstan.

* * * * *